United States Patent
Ciarelli et al.

[11] Patent Number: 5,184,519
[45] Date of Patent: Feb. 9, 1993

[54] HIGH RESOLUTION FLOW METER

[75] Inventors: Gary J. Ciarelli, Westland; J. Allan Lunk, Howell, both of Mich.

[73] Assignee: Illinois Tool Works, Inc., Glenview, Ill.

[21] Appl. No.: 599,650

[22] Filed: Oct. 18, 1990

[51] Int. Cl.$^5$ .............................................. G01F 3/10
[52] U.S. Cl. ................................ 73/861.77; 73/261
[58] Field of Search .............. 73/861.77, 861.78, 253, 73/261

[56] References Cited

U.S. PATENT DOCUMENTS

| | | |
|---|---|---|
| 4,399,709 | 8/1983 | Diepold-Scharnitzky ...... 73/861.77 |
| 4,641,522 | 2/1987 | Lopresti ........................... 73/261 |
| 4,878,454 | 11/1989 | Cann ................................ 118/663 |

Primary Examiner—Herbert Goldstein
Attorney, Agent, or Firm—MacMillan, Sobanski & Todd

[57] ABSTRACT

An improved resolution positive displacement flow meter of the type having a pair of meshed gears. A plurality of sensors are spaced to detect movement of the gear teeth as liquid flows through the flow meter. Where the gears each have n teeth and s sensors are used, the possible locations around the gear for each sensor relative to a reference point are determined by the formula $$\frac{360°}{n*s} * K + \frac{360°}{n} * L$$

where $K=0,1,2,\ldots,(s-1)$ and $L=0,1,2,\ldots,(n-1)$. The outputs from the sensors are logically combined, for example, by an exclusive OR circuit or by an OR circuit, to produce s pulses each time the gear rotates through the angle between two adjacent gear teeth.

8 Claims, 3 Drawing Sheets

HIGH RESOLUTION FLOW METER

CROSS REFERENCE TO RELATED APPLICATION

This is a continuation in part of our copending U.S. patent application Ser. No. 07/492,080 filed Mar. 9, 1990, now abandoned.

TECHNICAL FIELD

The invention relates to liquid flow meters and more particularly to an improved resolution positive displacement liquid flow meter of the type having two meshed gears rotated by fluid flowing through the flow meter.

BACKGROUND ART

For many industrial purposes, it is desirable to accurately measure the flow of liquid. For example, many industrial coatings are formed from mixing a resin and a hardener just prior to application. When applying a coating composed of a two component mixture, it is desirable to accurately measure liquid flow to maintain an accurate mixing ratio. The coating quality may be significantly affected by relatively small deviations in the mixing ratio. For many industrial applications a positive displacement flow meter is used to measure liquid flow.

A typical positive displacement flow meter consists of two meshed gears mounted to rotate in overlapping cylinders formed in a housing. Liquid enters an inlet chamber formed between the cylinder walls and the teeth on the two gears on one side of the location where the gear teeth mesh. The gears are rotated by the fluid flow until the fluid trapped between the teeth and the cylinder walls enters an outlet chamber on the opposite side of the location where the gear teeth mesh. Each time the gears rotate through an increment equal to the spacing between two adjacent gear teeth, a volume of liquid substantially equal to twice the volume trapped between two adjacent gear teeth on one gear and the cylinder walls is delivered to the outlet chamber. The flow meter includes a sensor which is responsive to the movement of the teeth on one gear past a predetermined location swept by the moving gear teeth. The sensor may be of various known designs. For example, the sensor may be an electromagnetic sensor which senses the presence or absence of a gear tooth at the predetermined location. Each time a gear tooth passes the location, an electric pulse is generated. By multiplying the number of pulses over a period of time times the volume of paint delivered through the flow meter each time the gears rotate through an increment equal to the gear tooth spacing, paint flow over the period of time is measured. For certain applications and especially at low flow rates, a higher resolution is desirable than that available from conventional positive displacement flow meters.

DISCLOSURE OF INVENTION

According to the invention, the resolution of a positive displacement flow meter is increased by providing multiple gear sensors positioned to generate pulses when the flow meter gears rotate through increments less than the spacing between the gear teeth. The outputs of the sensors are combined, for example, by exclusive OR (XOR) logic or by OR logic, to provide a pulse stream with a pulse each time the gears move through an increment equal to the gear spacing divided by the number of sensors. For example, if the flow meter gears are provided with ten teeth, then the leading edge of each tooth is spaced 36° from the leading edges of the two adjacent gear teeth. The prior art flow meters generate a pulse stream having a single pulse each time the gears rotate through 36°. If the exemplary flow meter delivers 1.2 cc of liquid each time the gears rotate through 36°, then a single pulse is produced for each 1.2 cc flowing through the flow meter. If two sensors are used in the same flow meter in accordance with the invention, a pulse is generated each time the gears rotate through 18°, or each time 0.6 cc of liquid is delivered. If three sensors are used, a pulse is generated each time the gears rotate through 12°, or each time 0.4 cc of liquid is delivered. Thus, the resolution of the positive displacement flow meter is improved over similar prior art flow meters having a single gear tooth sensor.

Accordingly, it is an object of the invention to provide a positive displacement liquid flow meter having a greater resolution than prior art liquid flow meters.

Other objects and advantages of the invention will be apparent from the following description and the accompanying drawings.

BEST MODE FOR CARRYING OUT THE INVENTION

Figure 1:
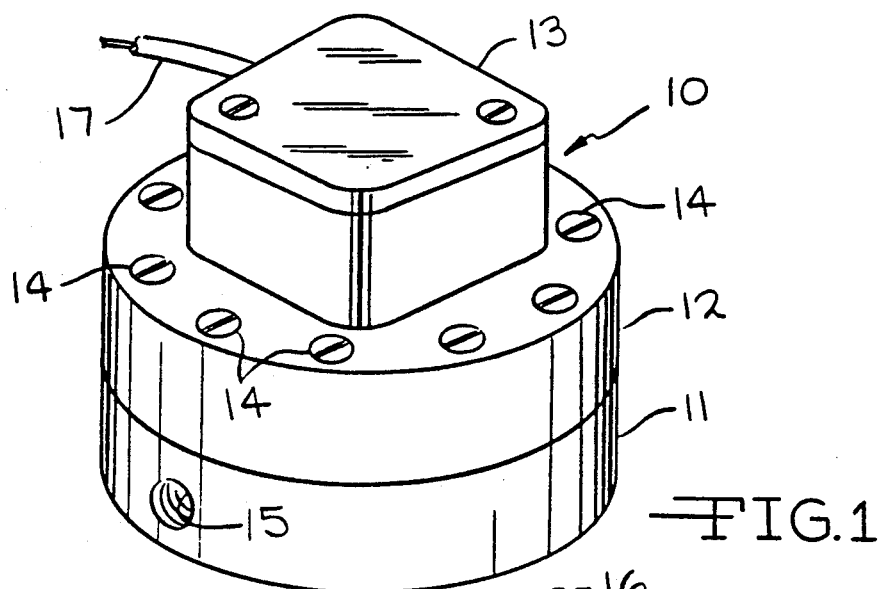
FIG. 1 is a perspective view of a positive displacement liquid flow meter incorporating the invention.

Referring to FIG. 1 of the drawings, a positive displacement liquid flow meter 10 is illustrated. The flow meter 10 generally includes a liquid housing 11 and a sensor housing 12 which includes a sensor circuit housing 13. The sensor housing 12 is attached to the liquid housing 11 by a plurality of screws 14. The liquid housing 11 has a fluid inlet 15 and a fluid outlet 16 (see FIG. 2). During operation of the flow meter 10, liquid enters the inlet 15 and after flowing through the liquid housing 11, is discharged from the outlet 16. An electric pulse output is produced on a cable 17 from the sensor circuit housing 13 each time a predetermined quantity of liquid flows through the flow meter 10.

Figure 2:
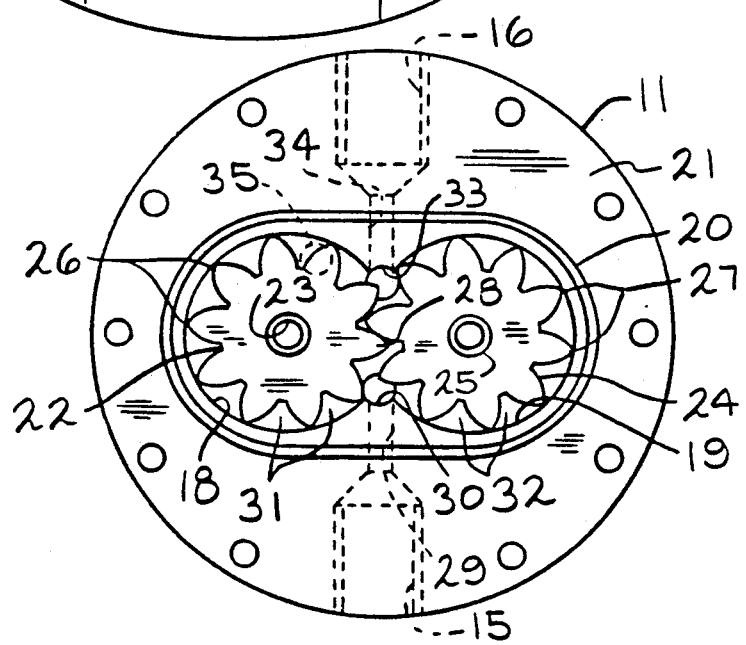
FIG. 2 is a top plan view of the liquid housing for the flow meter, of FIG. 1, with the sensor housing removed, showing the gears.

FIG. 2 is a top plan view of the liquid housing 11 with the sensor housing 12 removed. The housing defines two overlapping cylinders 18 and 19. A seal 20 is located in a groove on an upper face 21 of the housing 11 to form a liquid tight seal between the liquid housing 11 and the sensor housing 12 surrounding the cylinders 18 and 19. A gear 22 is mounted on a shaft 23 to rotate in the cylinder 18 and a gear 24 is mounted on a shaft 25 to rotate in the cylinder 19. The gear 22 has a plurality of teeth 26 and the gear 24 has a like number of teeth 27. The gear teeth 26 and 27 mesh at a common point 28 between the overlapping cylinders 18 and 19.

In operation, liquid is delivered to the inlet 15 and flows through a passage 29 to a chamber 30. The chamber 30 is formed between the gears 22 and 24 on one side of the point 28 where they mesh to the point where they abut the walls of the cylinders 18 and 19, respectively. As liquid is forced into the chamber 30, the fluid pressure causes the gear 22 to rotate in a clockwise direction and causes the gear 24 to rotate in a counter-clockwise direction. Liquid from the chamber 30 is trapped in voids 31 between the teeth 26 on the gear 22 and the wall of the cylinder 18 and in voids 32 between the teeth 27 on the gear 24 and the wall of the cylinder 19. As the gears 22 and 24 are rotated, liquid in the voids is transferred to a chamber 33. As the teeth approach the point 28 and begin to mesh, the voids 31 and 32 diminish and the fluid which was trapped therein is discharged through a passage 34 to the liquid outlet 16.

According to the prior art, a single sensor (represented by the dashed line circle 35 in FIG. 2) was mounted in the sensor housing 12 (FIG. 1) to generate a signal each time one of the gear teeth 26 or 27 passed a predetermined point on the path swept by the gear teeth as the gears 22 and 24 are rotated. The sensor can be of various known types and can be located at any convenient location adjacent the gear teeth path. For example, the sensor 35 may be of the proximity type which electromagnetically senses the presence or the absence of a gear tooth at the swept point. Proximity sensors typically operate in response to changes in capacitance or changes in impedance in a tuned circuit. The sensor may be, for example, a Hall effect device.

Figure 3:
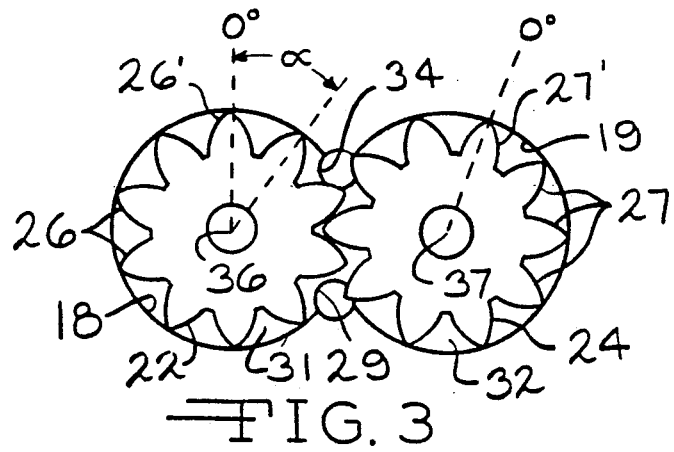
FIG. 3 is an enlarged fragmentary top plan view of the two meshed gears and the adjacent cylinder walls for the flow meter of FIG. 1.

For the following description of the invention, the flow meter 10 will be considered as having a pair of 10 tooth gears 22 and 24. However, it should be understood that the gears 22 and 24 may have any desired number of teeth 26 and 27, although they both will have the same number of teeth. As shown in the enlarged fragmentary view in FIG. 3, any individual tooth 26' on the gear 22 and any individual tooth 27' on the gear 24 may be selected as a 0° reference point. For convenience, the reference point is set at the leading edge of the tooth 27'. The gear 22 rotates about an axis 36 and the gear 24 rotates about an axis 37. The angle $\alpha$ between the teeth on the gears 22 and 24 is determined by the following formula $$\alpha = \frac{360°}{n}$$

where n equals the number of teeth on each gear 22 and 24. If n=10 as assumed above, than $\alpha=36°$ between adjacent gear teeth. Thus, the prior art flow meter will generate an output pulse each time the gears 22 and 24 rotates through a 36° increment. In other words, a single pulse is generated for each volume of fluid flow through the flow meter 10 as determined by the sum volume of the void 31 and the void 32.

According to the invention, several sensors 35 are located to sense the gear teeth. The multiple sensors 35 either are located to be sequentially triggered by a single gear tooth as the gears 22 and 24 are rotated through the angle $\alpha$, or the sensors 35 are spaced around the area swept by the moving gear teeth to be sequentially triggered by different gear teeth as the gears 22 and 24 are rotated through the angle $\alpha$. The multiple sensors 35 may be spaced around only one of the gears 22 or 24, or, if desired, some of the multiple sensors 35 may be located to be triggered by the teeth 26 on the gear 22 and others of the sensors 35 may be located to be triggered by the teeth 27 on the gear 24.

In order to provide volume flow pulses representing uniform volume increments, the minimum angular spacing $\beta$ between adjacent sensors is determined by dividing the angle $\alpha$ between the n gear teeth by the number of sensors s, as follows:

$$\beta = \frac{\alpha}{s} = \frac{360°}{n*s}$$

Typically, the sensors will be too large to fit within the spacing of a single gear tooth. This problem is solved by offsetting the sensors around the gear from the adjacent sensors by multiples of $\alpha$. Thus, the sensor spacings around the gear are determined by the formula $$\text{Sensor Spacing} = \frac{360°}{n*s} * K + \frac{360°}{n} * L$$

where $K=0,1,2,\ldots,(s-1)$ and $L=0,1,2,\ldots,(n-1)$. It will be appreciated that since the gears 22 and 24 must have the same number of teeth 26 and 27 and the teeth on each gear have the same spacings, some of the sensors may be located around the path swept by the teeth 26 on the gear 22 and others of the sensors may be located around the path swept by the teeth 27 on the gear 24. In each case, the angular location for the sensors are measured from the reference location for the gear tooth 26' or 27'.

Figure 4:
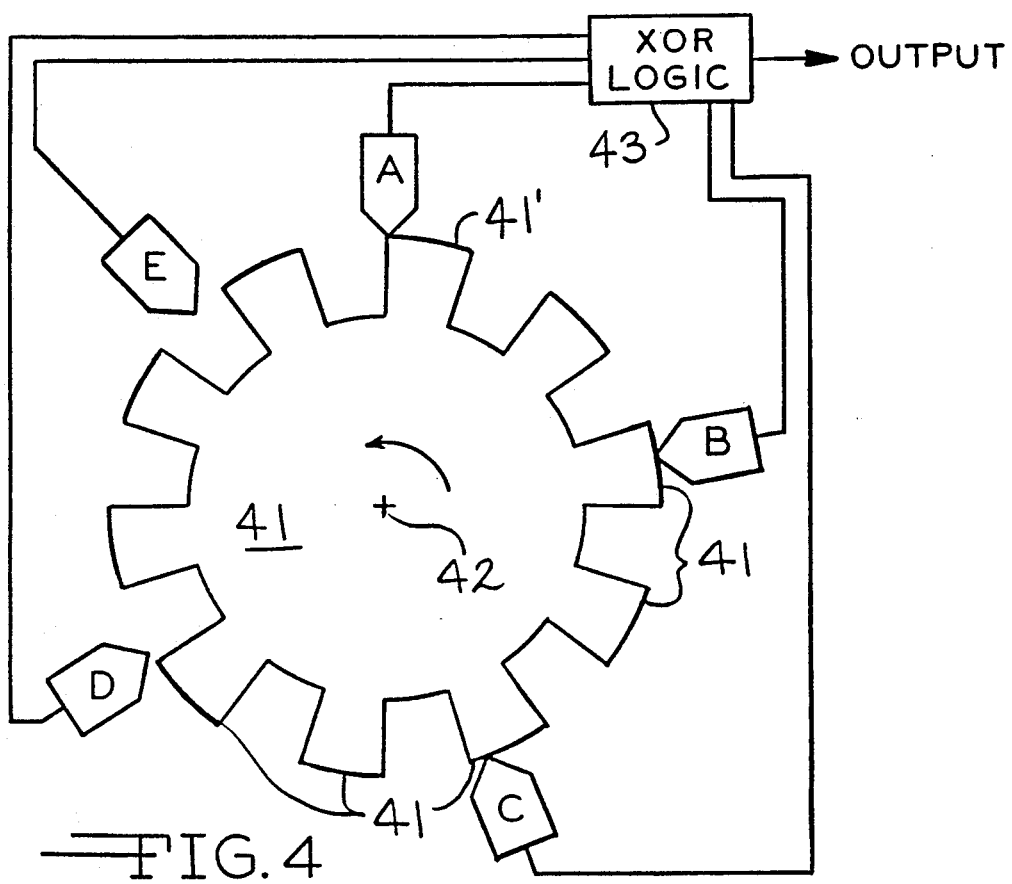
FIG. 4 is a diagrammatic view of a gear with having ten teeth and five adjacent sensors.

The diagrammatic view of FIG. 4 illustrates a gear 40 having 10 teeth 41 and 5 sensors A-E located to sense the gear teeth 41. Thus, the gear teeth 41 are spaced apart by $\alpha=36°$. The gear 40 is rotated in a counter-clockwise direction about an axis 42 as fluid flows through the flow meter. The Sensor A is located at the leading edge of a tooth 41' which is arbitrarily selected as the 0° reference. The remaining sensors have primary locations which are spaced apart from the adjacent sensors by a $\beta$ of 7.2°. However, due to the symmetry of the gear 40, each sensor can be placed at the same offset in relation to any gear tooth. In other words, each sensor can be offset from its primary location by multiples of $\alpha$. Thus, sensor A can be located at 0°, 36°, 72°, 108°, etc. from the reference point, sensor B can be located at 7.2°, 43.2°, 79.2°, etc. from the reference point, sensor C can be located at 14.4°, 50.4°, 86.4°, etc. from the reference point and similarly for the remaining sensors. In the embodiment illustrated in FIG. 4, the sensor A is located at the 0° reference, sensor B is located at 79.2°, sensor C is located at 158.4°, sensor D is located at 237.6° and sensor E is located at 316.8°. In practice, a sensor should not be located too close to the location where the teeth on the two gears mesh, or the sensor may erroneously sense the teeth from both gears.

Figure 5:
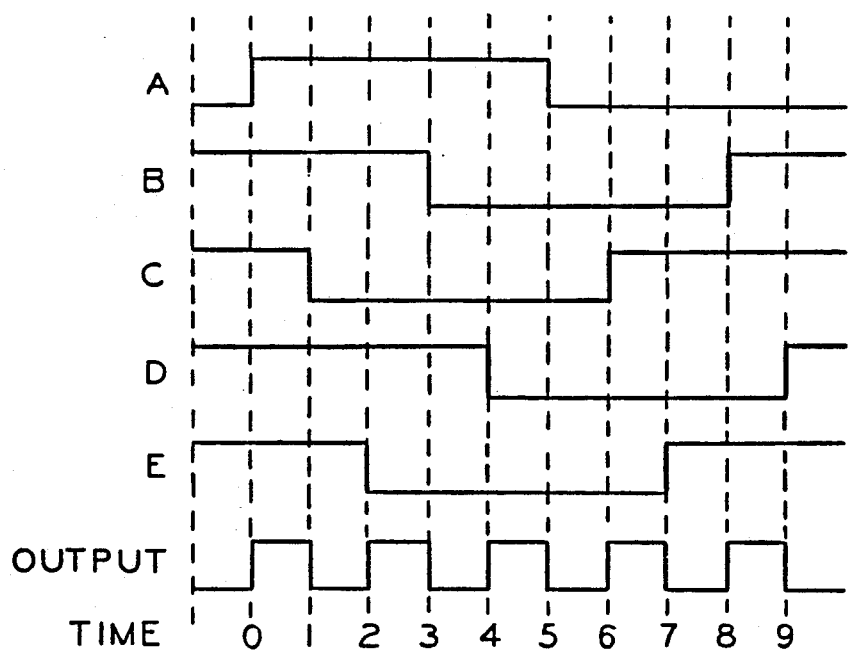
FIG. 5 is a graph showing the relative outputs from the five sensors in FIG. 4 as the gear is rotated through the angle of one gear tooth and the XOR logic combination of the five sensor outputs.

FIG. 5 is a graph of the outputs from the sensors A-E as the gear 40 is rotated in a counter clockwise direction through the increment $\alpha$ from the illustrated reference position. At times $t_0$ and $t_5$ the output from the sensor A changes, at times $t_3$ and $t_8$ the output from sensor B changes, at times $t_1$ and $t_6$ the output from sensor C changes, at times $t_4$ and $t_9$ the output from sensor D changes, and at times $t_2$ and $t_7$ the output from sensor E changes. Since more than one sensor may have an output at the same time, it is necessary to logically combine the outputs from the sensors A-E through exclusive OR or XOR logic 43. Table I shows the XOR logic for combining two digital signals X and Y. The XOR logic combines the outputs from the 5 sensors A-E according to the following formula:

$$\text{Output Signal} = ((((A+B)+C)+D)+E)$$

Table II shows the outputs from the five sensors A-E and the resulting pulse output for an XOR logic combination of the outputs from the sensors A-E as the gear 40 is rotated through the increment $\alpha$ over the time $t_0$ through $t_9$. As will be seen from Table II, the output will consist of a pulse signal having 5 pulses occurring at times $t_0$, $t_2$, $t_4$, $t_6$ and $t_8$ when the gear is rotated through the angle $\alpha$, or 36°. Thus, a pulse is produced for each one fifth of the volume of liquid flowing through the flow meter when the gear rotates through the angle $\alpha$.

TABLE I

| | Exclusive OR or XOR Logic | |
|---|---|---|
| X | Y | X + Y |
| 0 | 0 | 0 |
| 1 | 0 | 1 |
| 0 | 1 | 1 |
| 1 | 1 | 0 |

TABLE II

| Sensor | Sensor Output | | | | | | | | | |
|---|---|---|---|---|---|---|---|---|---|---|
| A | 1 | 1 | 1 | 1 | 1 | 0 | 0 | 0 | 0 | 0 |
| B | 1 | 1 | 1 | 0 | 0 | 0 | 0 | 0 | 1 | 1 |
| C | 1 | 0 | 0 | 0 | 0 | 0 | 1 | 1 | 1 | 1 |
| D | 0 | 0 | 0 | 1 | 1 | 1 | 1 | 1 | 1 | 0 |
| E | 0 | 0 | 1 | 1 | 1 | 1 | 1 | 0 | 0 | 0 |
| XOR | 1 | 0 | 1 | 0 | 1 | 0 | 1 | 0 | 1 | |
| time | $t_0$ | | $t_2$ | | $t_4$ | | $t_6$ | | $t_8$ | |

Figure 6:
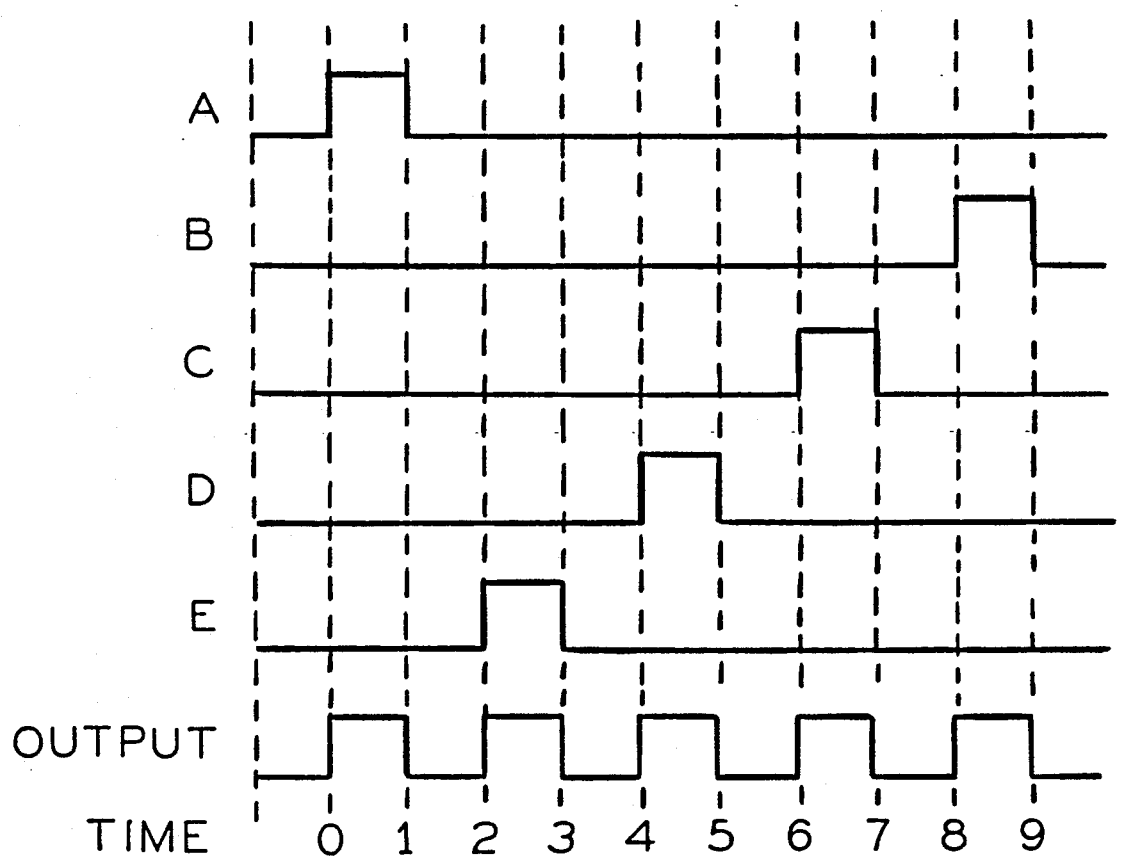
FIG. 6 is a graph showing the relative outputs from the five sensors arranged for sensing the tips of the teeth on one of the gears in FIGS. 2 and 3 as the gear is rotated through the angle of one gear tooth and the OR logic combination of the five sensor outputs.

It should be appreciated that the diagram in FIG. 4 illustrates squared gear teeth 41 for simplicity. The actual gear teeth will be shaped similar to the gear teeth 26 and 27 shown in FIGS. 2 and 3 to allow the gear teeth to mesh. In order for the sensors A-E to have the pulse forms shown in FIG. 5, the sensors A-E must be located in FIGS. 2 and 3 at a point on the path swept by the gear teeth 26 or 27 wherein the width of the teeth and the width of the spaces between the teeth are equal. If the sensors A-E are located to sense only the tips of the gear teeth 26 and 27, then the sensors A-E may produce sequential pulses as shown in the graph of FIG. 6. Only one of the sensors A-E will produce a pulse at any given time. The outputs from the five sensors A-E can be logically combined by an OR gate to produce a train of pulses with one pulse each time the gear moves through an increment $\beta$.

The number of divisions for each volume of liquid delivered through the flow meter is merely a function of the number of sensors. Thus, 2 sensors will divide the volume in half, 3 sensors will divide the volume in thirds, etc. Conventional circuitry (not shown) including commercially available integrated circuits may be used for combining the outputs from the sensors.

The logic 43 may be replaced by known circuitry which is responsive to only the leading edge or only to the trailing edge of the output from each of the sensors. Such circuitry will function even though different combinations of sensors have outputs at different times since the sensors are spaced so that only one sensor will see a leading tooth edge or a trailing tooth edge at any given time. This circuitry will function where the sensors each generate outputs for less than or more than an increment of $\alpha/2$. It will be appreciated that various other modifications and changes may be made to the improved flow meter of the invention without departing from the spirit and the scope of the following claims.

We claim:

1. In a positive displacement liquid flow meter having two gears mounted to rotate in overlapping cylinders, said gears having teeth which mesh in the region where said cylinders overlap, input and output chambers located on opposite sides of said meshed gear teeth, means for delivering liquid to said input chamber and means for receiving liquid from said output chamber, and means for sensing movement of said gear teeth for measuring the flow of liquid through said flow meter, the improvement wherein said sensing means includes a plurality of sensor spaced for detecting movement of said gear teeth, said sensors having angular spacings around at least one of said gears from a predetermined reference location for sequentially sensing different ones of said teeth as said gears rotate through an increment equal to 360° n where n= the number of teeth on each gear.

2. An improved positive displacement liquid flow meter, as set forth in claim 1, wherein said sensors are spaced to sequentially sense a different one of said teeth each time said gear rotates by an increment determined by the formula $$\frac{360°}{n * s}$$

where s= the number of sensors.

3. An improved positive displacement liquid flow meter, as set forth in claim 2, and including means for combining the outputs of said sensors for establishing a pulse signal having s pulses each time said gears rotate through an increment equal to 360°/n.

4. An improved positive displacement liquid flow meter, as set forth in claim 1, and including means for combining the outputs of said sensors for establishing a pulse signal having s pulses each time said gears rotate through an increment equal to 360°/n.

5. In a positive displacement liquid flow meter having two gears mounted to rotate in overlapping cylinders, said gears having teeth which mesh in the region where said cylinders overlap, input and output chambers located on opposite sides of said meshed gear teeth, means for delivering liquid to said input chamber and means for receiving liquid from said output chamber, and means for sensing movement of said gear teeth for measuring the flow of liquid through said flow meter, the improvement wherein said sensing means includes a plurality of sensor spaced for detecting movement of said gear teeth, said sensors having spacings around at least one of said gears from a predetermined reference location determined by the formula $$\frac{360°}{n * s} * K + \frac{360°}{n} * L$$

where n=the number of teeth on each gear, s=the number of sensors, K=0,1,2, . . . ,(s−1) and L=0,1,2, . . . ,(n−1).

6. An improved positive displacement liquid flow meter, as set forth in claim 5, wherein said sensing means further includes logic means for combining outputs from said sensors for producing a pulse signal having s pulses each time the gears rotate through an increment equal to 360°/n.

7. An improved positive displacement liquid flow meter, as set forth in claim 6, wherein said logic means combines the outputs from said sensors through XOR logic.

8. An improved positive displacement liquid flow meter, as set forth in claim 6, wherein said logic means combines the outputs from said sensors through OR logic.

* * * * *